Feb. 20, 1934.  W. F. SPRENGNETHER  1,947,809
MINER'S COMPASS OR DIP NEEDLE
Filed April 10, 1933

INVENTOR:
WILLIAM F. SPRENGNETHER
By Harry A. Barnes
ATTORNEY.

Patented Feb. 20, 1934

1,947,809

UNITED STATES PATENT OFFICE 1,947,809

MINER'S COMPASS OR DIP NEEDLE

William F. Sprengnether, St. Louis, Mo.

Application April 10, 1933. Serial No. 665,245

4 Claims. (Cl. 33—222)

My invention has relation to improvements in miners' compasses or dip needles, and it consists in the novel features of construction more fully set forth in the specification and pointed out in the claims.

Miners' compasses as is well known are generally held in position for use with the rotation axis of the needle in a horizontal plane so that the needle may be deflected under the influence of an ore body or other ferrous substance in the earth. For this reason the compass is generally suspended from a strap with the scale on one side of the casing so that the amount of vertical deflection of the needle may be read. On account of the scale being on the side of the compass case and disposed along an arc in a vertical plane it is difficult to read the same while holding the compass near the ground.

The present invention is directed to improvements that overcome the difficulty in reading the compass scale and has for its principal object the embodiment of an arcuate scale formed in the top of the case so that readings may be obtained by the observer from positions above the case. This enables the scale to be readily read while suspending the instrument from a strap or while the instrument is resting on the ground. In order that the instrument may stand firmly the case is provided with a flat base whereon it may stand firmly without any other support.

It is a further object of the invention to associate with the magnetic needle a suitable pointer-arm which operates over the scale to give a direct reading in degrees of the amount of deflection of the compass needle from a horizontal position, the horizontal position of the needle of course indicating an absence of magnetic substance in the earth so that the pointer-arm will indicate instantly the quality of the magnetic substance by the amount of its deflection from the zero position of its scale which is at the zenith of the needle's orbit.

Figure 1:
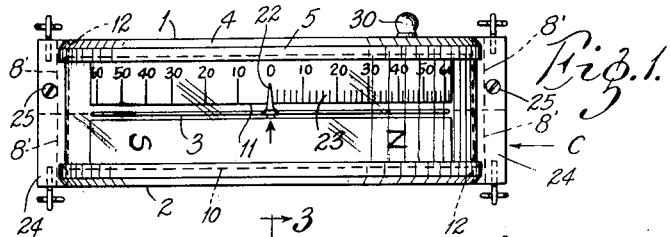
Figure 2:
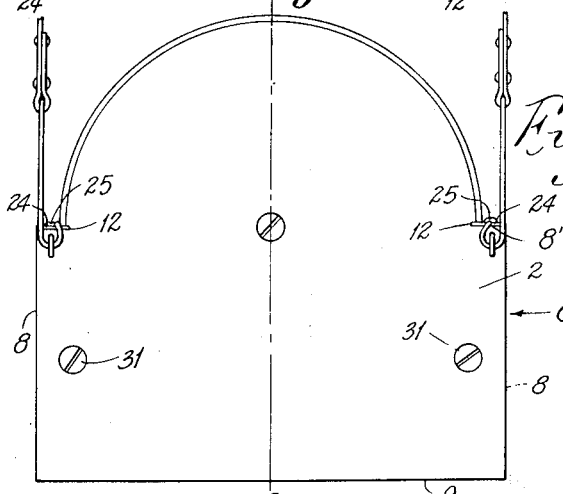
Figure 3:
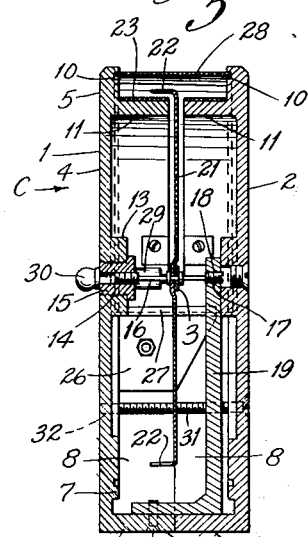
Figure 4:
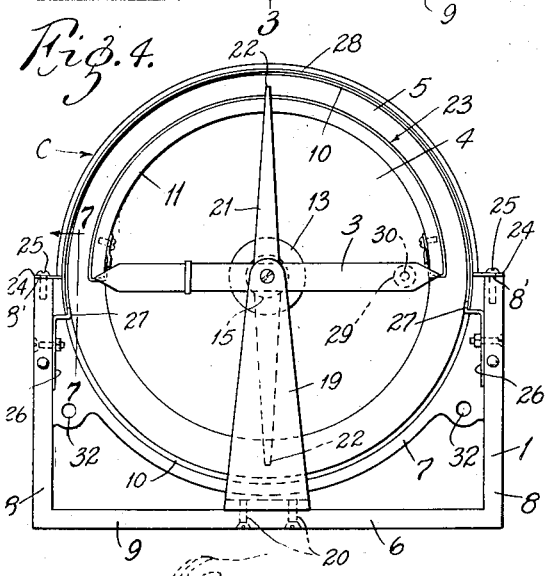
Figure 5:
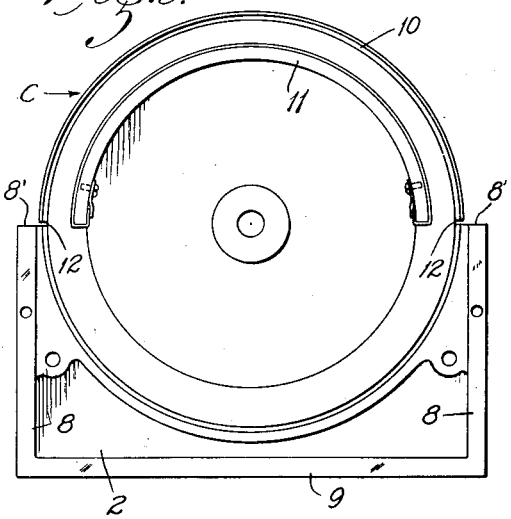
Figure 6:
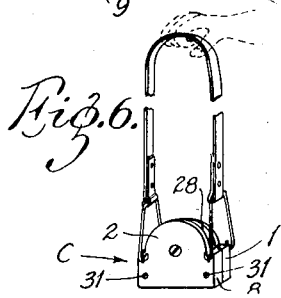
Figure 7:
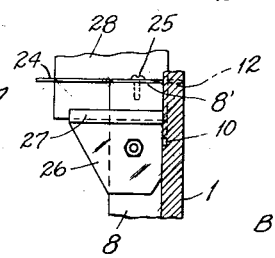

Further and other advantages will be better apparent from a detailed description of the invention in connection with the accompanying drawing, in which:

Figure 1 is a top plan of my improved miner's compass; Fig. 2 is a side elevation thereof; Fig. 3 is a middle vertical section of the compass taken on the line 3—3 of Fig. 2; Fig. 4 is a side elevation of the inside of one section of the case in which the needle is mounted; Fig. 5 is a side elevation of the inside of the other section of the case which constitutes the cover of the case; Fig. 6 is a perspective view on a reduced scale showing the case supported by a strap whereby it may be conveniently and practically used; and Fig. 7 is a vertical sectional detail taken on the line 7—7 of Fig. 4.

Referring to the drawing, C represents the case for my improved miner's compass which comprises two sections 1 and 2, the sections being practically identical except that the magnetic cross-arm or dipping needle 3 and associated parts are mounted in the section 1, while the section 2 serves as a cover therefor. The side wall 4 of section 1 has an upper semi-circular portion 5 and a lower rectangular base portion 6, the upper portion 5 comprising a part of a disk 7 formed on the inner surface of side wall 4. The rectangular portion 6 has end walls 8, 8 and a bottom 9 extending inwardly from the outer surface of the section 7, said end walls having their inner surface tangent to the periphery of the disk 7 so that their upper edges form ledges 8', 8'. A circular groove 10 is formed entirely around the disk 7 in close proximity with its periphery, and a semi-circular flange 11 extends inwardly from the upper half of the disk 7. The depth of the flange 11 is slightly less than the depth of the end walls 8, 8 on the inside for a purpose presently to appear. Diametrically opposite and immediately adjacent to the ledges 8', 8' are radial kerfs 12, 12. At the center of disk 7 is a boss 13 provided with a threaded opening 14 in which is supported one bearing 15 for a shaft 16, the other bearing 17 being supported in a threaded opening 18 formed in the upper end of a bracket 19 secured by screws 20, 20 to the inner surface of the base 9. Fixed on the shaft 16 is the magnetic cross-arm 3 which serves as the compass needle, and fixed to the center of cross-arm 3 at right angles thereto is a pointer-arm 21 having horizontally disposed pointers 22, 22 on the ends thereof. A degree scale 23 is mounted on the semi-circular flange 11 so that the zero point is perpendicularly over the shaft 16 with the degree readings extending in both directions therefrom to mark off 90° quadrants. Obviously, instead of the scale being formed on a separate strip such as here shown it may be marked directly on the surface of the flange 11. A thin metallic strip 24 is secured by means of a screw 25 on each ledge 8' with one end lodged in kerf 12, said strip being of a length as to project beyond the side wall 1 a distance equal to the width of said end wall. A bracket 26 having a flanged offset 27 is secured on the inner surface of each end wall 1 slightly below the strip 24 and the flanged offset extending inwardly just beyond the inner edges of groove 10. The strips 24, 24 and flanged extremities of brackets 26, 26 cooperate in holding in place a transparent arcuate window 28 which is lodged in the upper part of groove 10, the ends of said window being confined between the strips 24 and adjacent flanges 27 of brackets 26.

The above description of section 1 of the case C also applies to section 2, which serves as the cover, said section being similarly constructed, and when it is placed in articulating relation with section 1 the edges of the end walls 8, 8 and base 9 of both sections will come into intimate abutting relation while the free edge of the window 28 will be lodged within the groove of section 2 corresponding to groove 10 of section 1. The strips 24, 24 will also enter the kerfs of section 2 corresponding to the kerfs 12, 12 of section 1. However, the arcuate flange of section 2 corresponding with the arcuate flange 11 of section 1 will be in spaced relation when the sections are assembled since the depths of the flanges 11 are slightly less than the depth of the end walls 8, 8 and base 9. Obviously, the space between flanges 11, 11 is necessary in order to provide a slot in which the needle 3 and pointer arm 21 may operate (Fig. 1). A hollow boss 29 is provided within the section 1 just inside the arc of travel of the end of the magnetic arm 3 and a stop-pin 30 is provided for insertion in said boss which serves as a keeper for the magnetic arm and prevents the same from oscillating when not in use. The sections 1 and 2 are secured in their assembled position by means of countersunk screws 31, 31 which traverse section 2 and enter threaded openings 32, 32 in section 1.

From the foregoing it is apparent that I have provided a miner's compass that is easily readable when resting on the ground or suspended thereover and one that is compact and of simple construction and the parts of which are easily accessible for adjustment or repair.

It is obvious of course that the case C, as well as the other parts of the instrument except the magnetic arm 3, be made of non-magnetic material so as not to interfere with the action of the magnetic arm under the influence of the earth's magnetism or that of a ferrous body within the earth. The pointer arm 21 is likewise of a non-magnetic material so that it will undergo no deflections of its own but will move only with the needle 3 as it is deflected by some magnetic force.

Having described my invention, I claim:

1. A compass comprising a casing having a transparent arcuate wall portion, a shaft mounted in said casing, the rotation axis of said shaft lying on the center of the arc defining said wall portion, a magnetic cross-arm fixed to said shaft, a pointer arm relatively fixed to the shaft and angularly spaced from the magnetic arm, and an arcuate degree scale parallel to said transparent wall portion, the outer end of said pointer arm being disposed in close proximity to the scale.

2. A compass comprising a casing, said casing including two articulating sections, said sections having arcuate flanges in opposed spaced relation, a shaft mounted in the casing, the rotation axis of said shaft lying on the center of the arc defining said flanges, a magnetic needle fixed to said shaft, a pointer arm fixed at the center of the needle and perpendicular thereto, and a degree scale marked on one of said arcuate flanges, the outer end of said pointer arm being disposed in close proximity to the scale.

3. A compass comprising a casing having a flat bottom and an arcuate top, a shaft mounted in said casing, the rotation axis of said shaft lying on the center of the arc defining the top of the casing, a magnetic cross-arm fixed to said shaft, a pointer arm relatively fixed to the shaft and angularly spaced from the cross-arm, an arcuate degree scale disposed in parallelism with the arcuate top of the casing and a window in said casing top co-extensive with the degree scale whereby the position of the pointer arm may be observed relative to said scale.

4. A compass having a suitable casing, said casing comprising two similar articulating sections, a magnetic cross-arm and a pointer arm fixed to said cross arm, both being rotatably supported in one of said sections, each of said sections having a semi-circular top portion and a rectangular base portion, said base portions being disposed in abutting relation and the semi-circular top portions being disposed in spaced relation when the sections are articulated, and a transparent arcuate wall portion disposed between the semi-circular top portions.

WILLIAM F. SPRENGNETHER.